(12) United States Patent
Busboom et al.

(10) Patent No.: US 6,226,970 B1
(45) Date of Patent: May 8, 2001

(54) BAGGING ASSEMBLY FOR A RIDING LAWN MOWER

(75) Inventors: Garry W. Busboom, Beatrice; C. Mark Atterbury, Lincoln, both of NE (US)

(73) Assignee: Exmark Mfg. Co., Inc., Beatrice, NE (US)

(*) Notice: Subject to any disclaimer, the term of this patent is extended or adjusted under 35 U.S.C. 154(b) by 0 days.

(21) Appl. No.: 09/459,194

(22) Filed: Dec. 10, 1999

(51) Int. Cl.$^7$ .................................................. A01D 34/70
(52) U.S. Cl. ........................................ 56/202; 56/16.6
(58) Field of Search .................................. 56/13.3, 13.4, 56/16.9, 16.6, 202, 203; 248/99, 101; 15/340.1, 340.3, 347

(56) References Cited

U.S. PATENT DOCUMENTS

| | | | |
|---|---|---|---|
| Re. 32,954 | * 6/1989 | Lamusga | 56/202 |
| 3,257,788 | 6/1966 | Pirie | 56/202 |
| 3,722,192 | 3/1973 | Corbett | 56/202 |
| 4,015,406 | 4/1977 | Witt et al. | 56/202 |
| 4,522,019 | * 6/1985 | Edwards et al. | 56/202 |
| 4,589,251 | 5/1986 | Amano et al. | 56/202 |
| 4,637,202 | 1/1987 | Lamusga | 56/16.6 |
| 4,738,088 | 4/1988 | Klever et al. | 56/202 |
| 4,903,469 | 2/1990 | Murakawa et al. | 56/202 |
| 4,926,624 | 5/1990 | Murakawa et al. | 56/202 |
| 4,969,320 | 11/1990 | Langford | 56/16.6 |
| 4,984,419 | 1/1991 | Sampei et al. | 56/202 |
| 4,989,400 | 2/1991 | Wark | 56/202 |
| 5,042,241 | 8/1991 | Boylston et al. | 56/202 |
| 5,107,661 | 4/1992 | Shimamura | 56/12.8 |
| 5,243,809 | 9/1993 | Redding | 56/202 |
| 5,875,620 | 3/1999 | Goeke et al. | 56/13.4 |

* cited by examiner

Primary Examiner—Robert E. Pezzuto
(74) Attorney, Agent, or Firm—Zarley, Mckee, Thomte Voorhees & Sease; Dennis L. Thomte

(57) ABSTRACT

A bagging assembly for a riding lawn mower including a mower deck having a grass discharge conduit extending upwardly and rearwardly therefrom. The bagging assembly includes a support for supporting a pair of grass collection bags thereon together with a hood which is selectively movably disposed above the bags. The support structure includes an elongated, horizontally disposed cross-beam having a bag-supporting frame secured thereto which extends rearwardly therefrom. A flexible seal is secured to the cross-beam along the length thereof and is also secured to the lower forward end of the hood to prevent grass clippings from falling downwardly and forwardly through the space normally found between the lower forward end of the hood and the support structure. When the hood is in its closed position, the flexible seal engages the upper forward portions of the grass collection bags to maintain the bags in position.

24 Claims, 8 Drawing Sheets

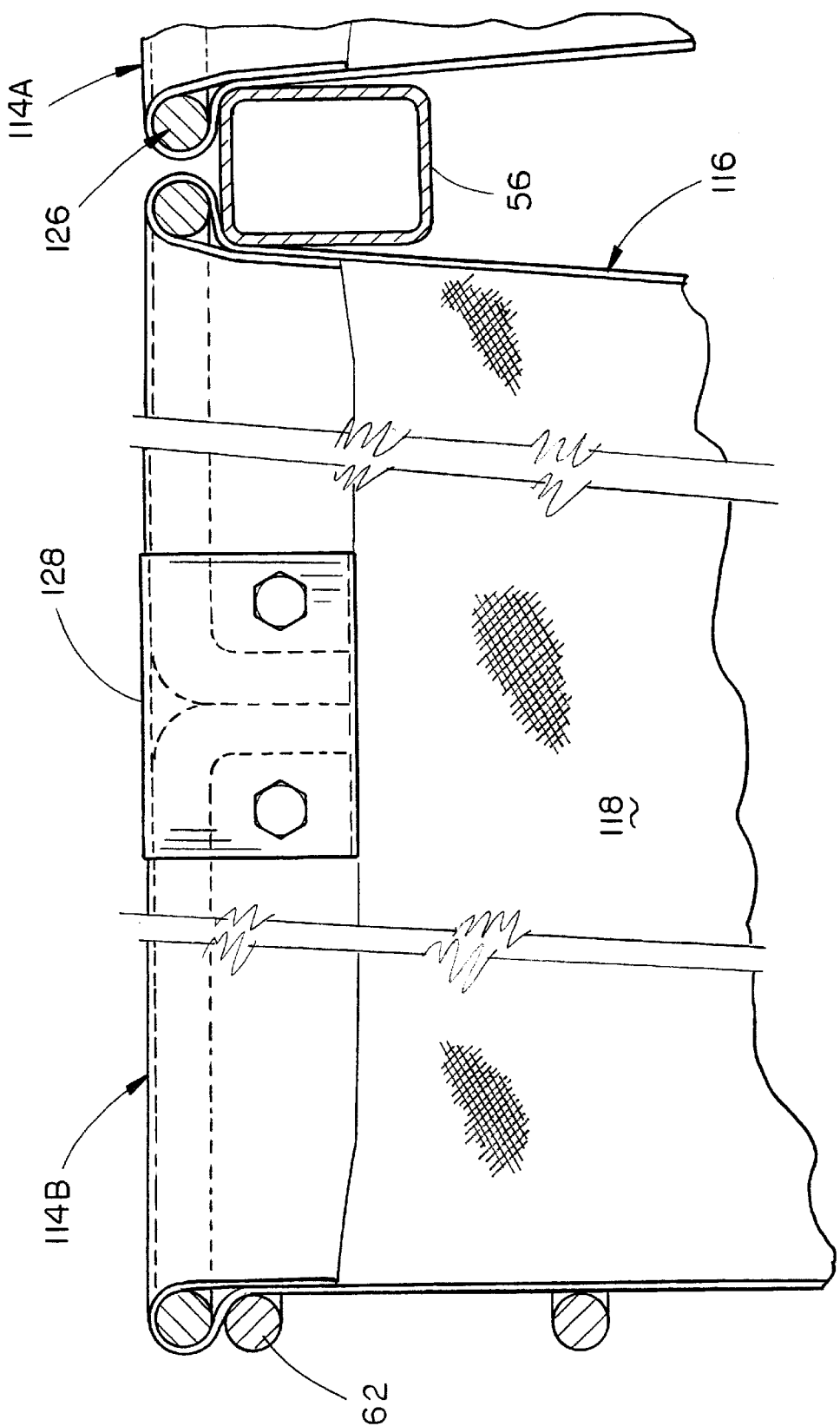

BAGGING ASSEMBLY FOR A RIDING LAWN MOWER

BACKGROUND OF THE INVENTION

1. Field of the Invention

This invention relates to a grass catcher assembly or bagging assembly for use at the rear end of a riding lawn mower.

2. Description of the Related Art

Grass catchers or bagger assemblies have long been used in conjunction with riding lawn mowers. In many instances, blower assemblies are mounted on the discharge side of the mower decks for blowing the grass clippings, leaves, etc., rearwardly and upwardly from the mower deck to a grass catcher or bagging assembly mounted on the rear of the mower. The deck discharge air contains large quantities of dust and debris, which are detrimental to the longevity of the mower should the same come into contact with the engine of the mower. In many of the bagging assemblies which are mounted on the rearward ends of mowers, a pivotal hood or cover is positioned over one or more bags. In certain of the prior art bagging assemblies, the deck discharge air escapes into the atmosphere between the upper ends of the bags and the lower end of the hood, with that discharge air and the debris associated therewith being directed onto the mower. Further, in those bagging assemblies described above, when the hood is pivotally moved to its open position so that the filled bags may be removed from the assembly, grass clippings, leaves, etc., fall between the hinged portion of the hood and its supporting structure onto the mower.

Further, in many of the bagging assemblies described above, the bags are constructed of a loose weave material so that air may pass therethrough as grass clippings are deposited therein with the result being that debris is discharged through the walls of the bag onto the mower.

SUMMARY OF THE INVENTION

A bagging assembly is provided for a riding lawn mower including a mower deck having a grass discharge conduit extending rearwardly and upwardly therefrom. The bagging assembly is secured to the rearward end of the lawn mower and includes a support structure for supporting a pair of grass bags thereon together with a hood which is selectively movably disposed above the bags. The support structure includes an elongated, horizontally disposed cross-beam having a bag-supporting framework secured thereto which extends rearwardly therefrom. The hood includes a front wall, a top wall, opposite side walls, an upstanding rear wall, and an open bottom defined by the lower ends of the front wall, opposite side walls, and rear wall, with the front wall of the hood being hingedly secured to the cross-beam to enable the hood to be hingedly moved between open and closed positions. An elongated, generally rectangular flexible hinge seal is secured to and extends between the cross-beam and the lower end of the front wall of the hood to seal the gap between the cross-beam and the lower end of the front wall of the hood to prevent debris from passing therebetween onto the mower. When the hood is in its closed position, the flexible hinge seal engages and overlies the front portions of the bags to aid in maintaining the bags in position and to prevent debris from passing forwardly over the forward ends of the bags when the hood is in its closed position. When the hood is moved to its open position, the flexible hinge seal moves upwardly and forwardly with respect to the bags to enable the bags to be removed from the supporting framework.

It is a principal object of the invention to provide an improved bagging assembly for a riding lawn mower.

It is a further object of the invention to provide a bagging assembly including a pair of bags supported upon a framework and having a hood positioned thereabove with the gap between the lower forward end of the hood and the bags being sealed by means of a flexible hinge seal.

Still another object of the invention to provide a hinge seal for use on a bagging assembly which prevents debris from falling onto the mower.

Still another object of the invention to provide a hinge seal for a bagging assembly which also aids in maintaining the bags in position when the hood is in its closed position.

These and other objects of the invention will be apparent to those skilled in the art.

BRIEF DESCRIPTION OF THE DRAWINGS

FIG. 7 is a partial sectional view, as seen on lines 7—7 of FIG. 4, illustrating the means by which the bags are supported;

DESCRIPTION OF THE PREFERRED EMBODIMENT

Figure 1:
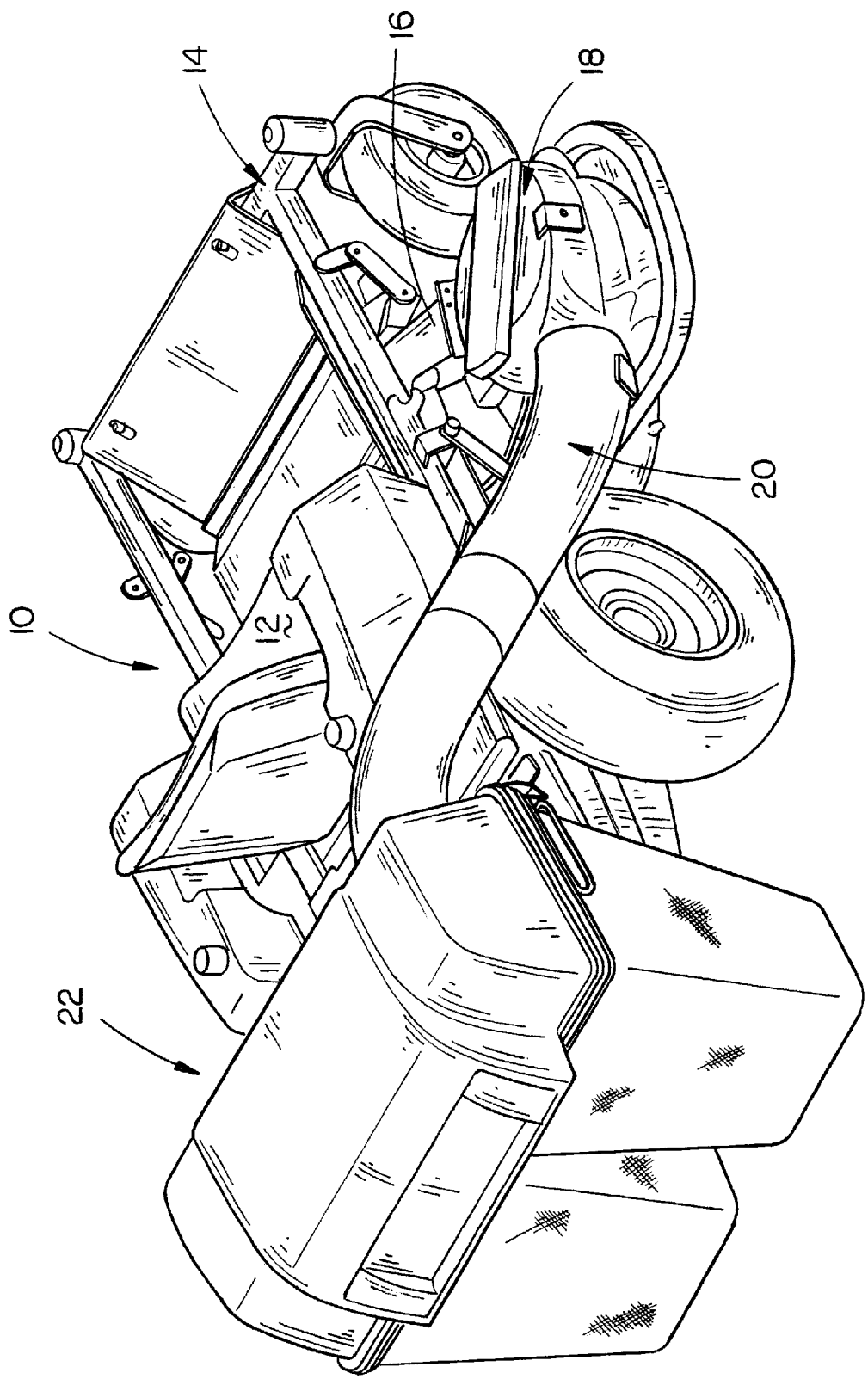
FIG. 1 is a rear perspective view of the bagging assembly of this invention mounted on a riding lawn mower.
Figure 2:
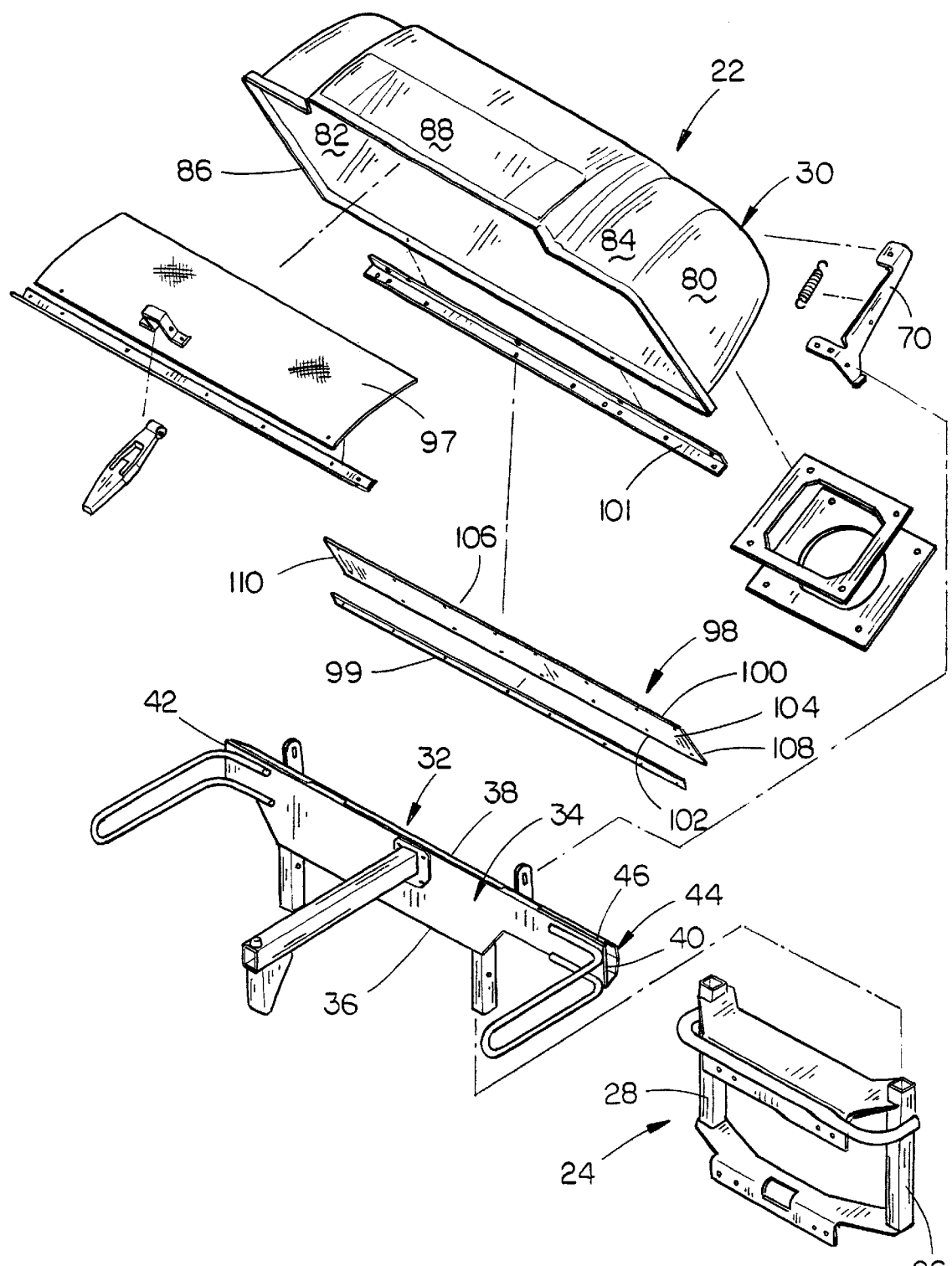
FIG. 2 is a partial rear exploded perspective view of the invention.

In the drawings, the numeral 10 refers to a riding lawn mower including an operator's seat 12 positioned on a wheeled frame means generally referred to by the reference numeral 14. The mower 10 includes a mower deck 16 in which are mounted the rotating cutting blades for cutting grass. In most cases, the grass clippings are discharged from one side of the cutting deck, but in some cases it is desirable to catch the grass clippings. To that end, a belt driven blower assembly 18 is operatively connected to one side of the cutting deck 16 for creating a vacuum within the underside of the cutting deck so that the grass clippings will be blown upwardly and rearwardly through a tube assembly 20 into a grass catcher assembly 22.

To enable the grass catcher assembly 22 to be mounted to the rearward end of the mower 10, a bagger mount 24 is bolted to the rearward end of the mower and includes a pair of vertically disposed tubular members 26 and 28 having open upper ends.

Figure 3:
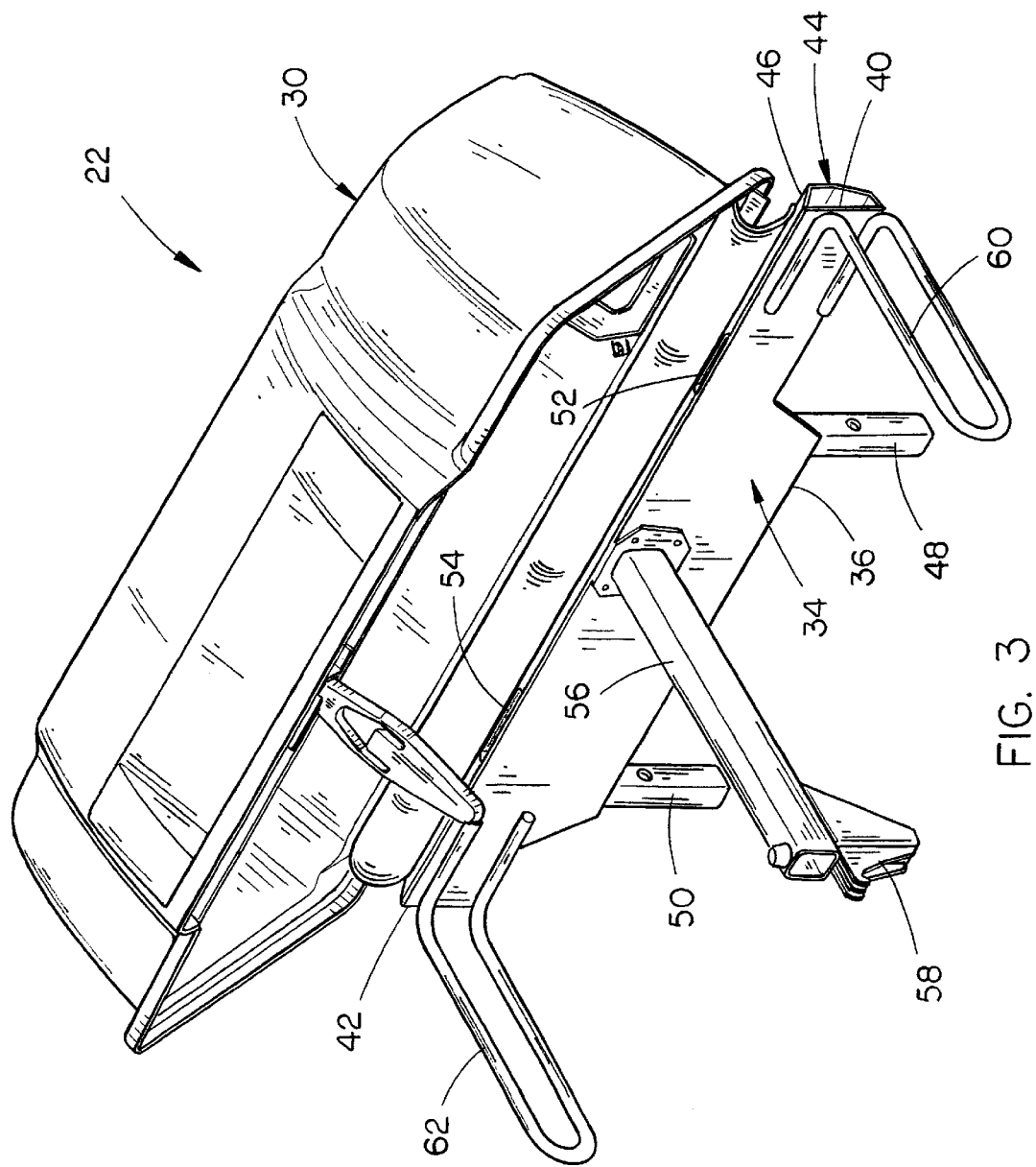
FIG. 3 is a partial rear perspective view of the invention.
Figure 4:
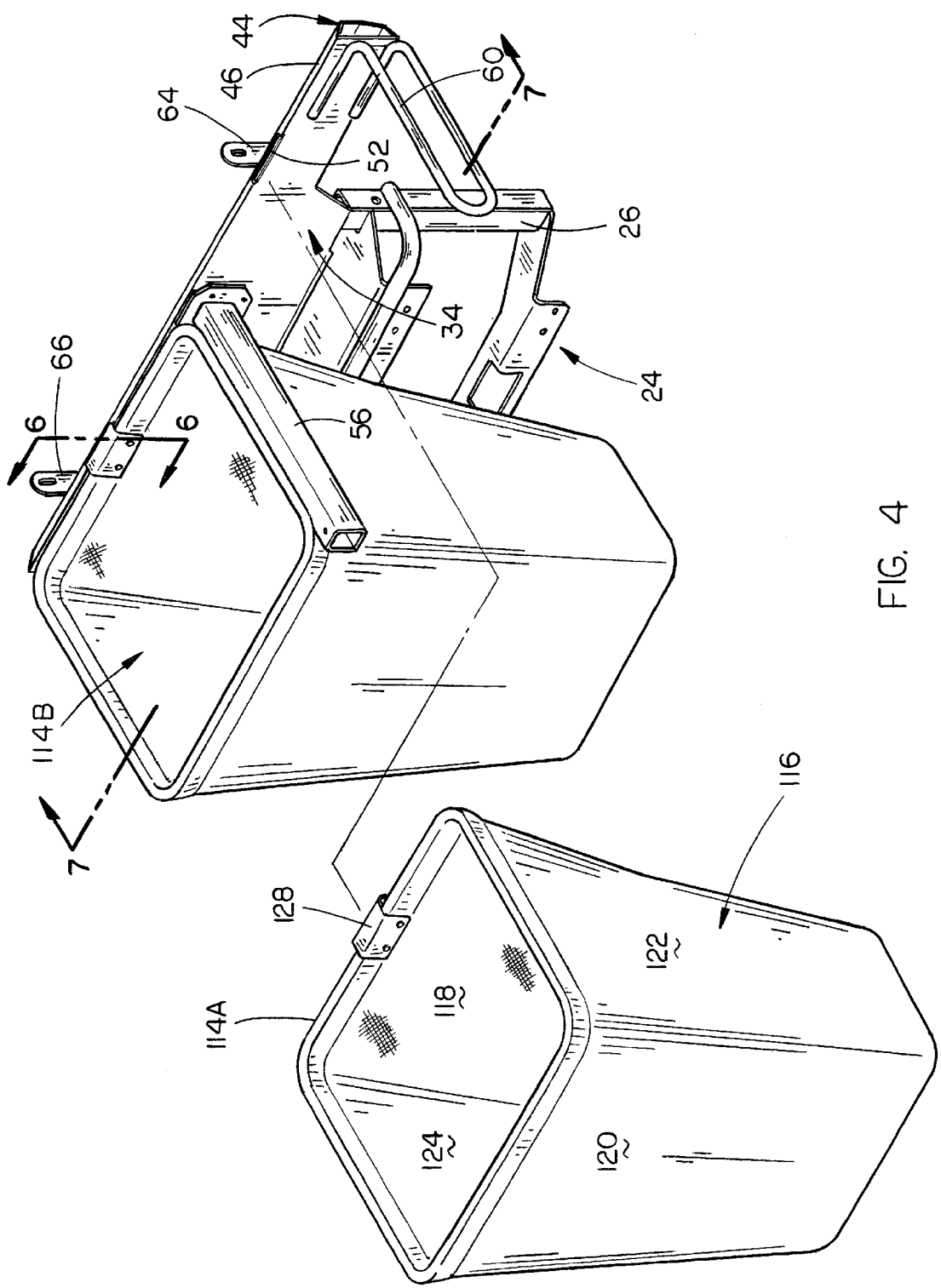
FIG. 4 is a partial exploded rear perspective view of the invention.
Figure 6:
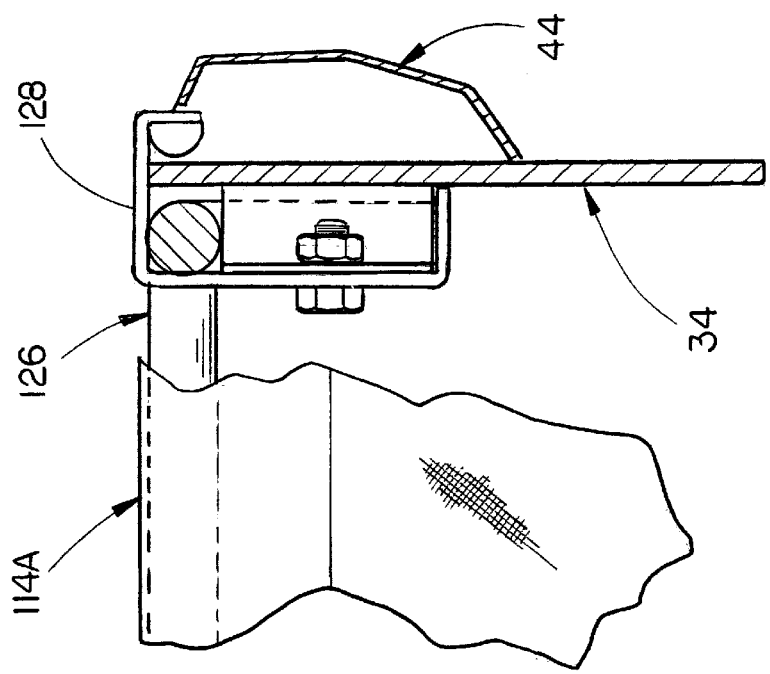
FIG. 6 is a partial sectional view as seen on lines 6—6 of FIG. 4.
Figure 5:
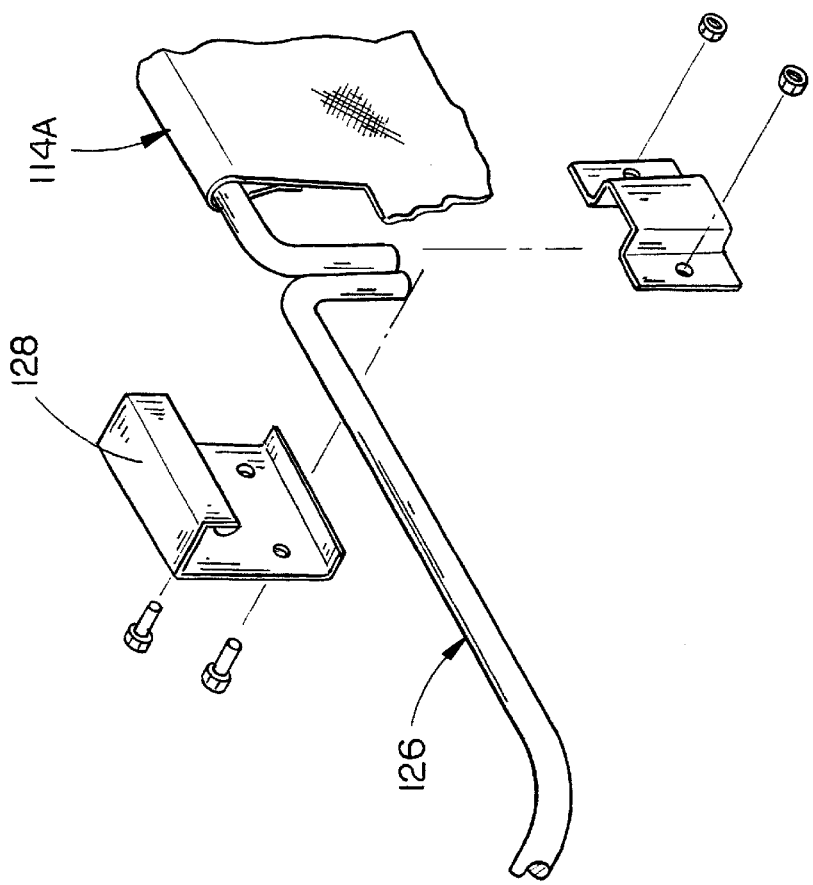
FIG. 5 is a partial front perspective view of one of the bag assemblies.

The numeral 30 refers to a hood assembly including a mount 32. Mount 32 includes a vertically disposed blocking plate 34 having a lower end 36, an upper end 38, and opposite ends 40 and 42. A channel-like cross-beam 44 is welded to the upper forward side of blocking plate 34 and includes an inclined upper end 46. Although the cross-beam 44 is the preferred structure, the cross-beam 44 could be replaced by some sort of laterally extending support, if desired. A pair of downwardly extending support posts 48 and 50 are welded to the forward side of blocking plate 34 and extend downwardly therefrom for reception by the tubular members 26 and 28, respectively. Posts 48 and 50 may be secured to the tubular members 26 and 28 by means of bolts extending therethrough. As seen in FIG. 3, the inclined upper end 46 of cross-beam 44 is provided with a pair of spaced-apart openings 52 and 54 formed therein for a purpose to be described hereinafter.

An elongated bag support 56 is secured to the rearward side of plate 34 and extends rearwardly therefrom as seen in FIG. 3. Catch 58 is mounted on the lower rearward end of support 56. Bag supports 60 and 62 are welded to the outer ends of plate 34, as seen in FIG. 3, and extend rearwardly therefrom.

A pair of spaced-apart hinge plates 64 and 66 are welded to the forward side of cross-beam 44 adjacent the outer ends thereof and have a laterally extending pin 65 at the lower ends thereof which each receive the lower end of a spring 67. Each of the hinge plates 64 and 66 have a slot 68 formed in the upper end thereof which each receive a laterally extending pin P secured to each of hinge plates 70 and 72 which are secured to hood 74 of hood assembly 30. The slots 68 permit a small amount of vertical movement of hood 74 with respect to hinge plates 64 and 66.

Hood 74 which includes a substantially vertical and rectangular front wall 76, a substantially horizontal top 78, right and left substantially vertical side walls 80 and 82, a rear wall 84, and an open substantially rectangular and horizontal bottom opening 86, the periphery of which consists of the lower horizontal edges of walls 76, 80 and 82. Rear wall 84 includes a central bulge 88, extending across about two-thirds of the rear wall 84 and centered thereon, formed by an outer surface 90 and an inner surface 92. Surfaces 90 and 92 are spaced-apart one from the other and combine to form a vent 96 which is open at the bottom, adjacent the lower periphery of hood 74. Inner surface 92 carries a screen 97 which allows the air issuing from the discharge tube 20 to escape through vent 94 and eventually into the atmosphere, minus the grass clippings, leaves, etc.

Figure 9:
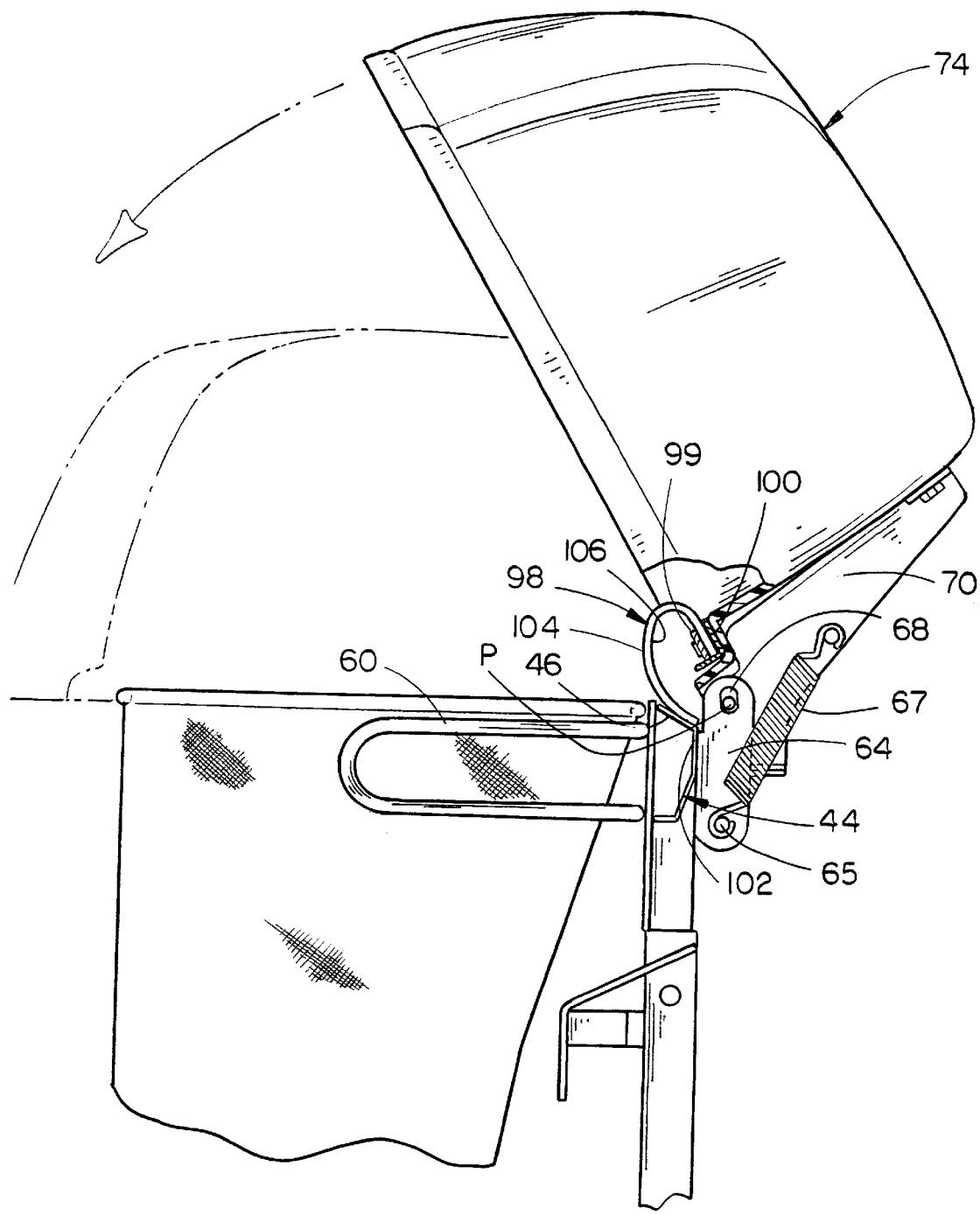
FIG. 9 is a view similar to FIG. 8 except that the hood has been moved to its open position.

The numeral 98 refers to a flexible seal which is generally rectangular in shape and which has an upper end 100, lower end 102, opposite surfaces 104 and 106, and opposite ends 108 and 110. Lower end 102 is secured to the inclined upper surface 46 of cross-beam 44 by bolts or the like and extends substantially the entire length of the cross-beam 44. Seal 98 is bent or folded upon itself and is secured to hood 74 in the manner illustrated in FIG. 9. As seen in FIG. 9, a flat plate 99 maintains seal 98 against a bracket 101 which is positioned adjacent the lower inner surface of front wall 76 of hood 74. Conventional bolts extend through plate 99, seal 98, bracket 101 and front wall 76. When the hood 74 is in its open position, the seal 98, by extending between the cross-beam 44 and the lower forward end of hood 74 along the length of the cross-beam 44, prevents grass clippings, leaves, debris, etc., from passing downwardly and forwardly between the cross-beam 44 and the hood 74 thereby preventing the grass clippings, etc., from coming into contact with the engine of the mower which is disposed forwardly of the bagger assembly.

Normally, a pair of bags 114A and 114B are utilized in the grass catcher assembly 22. In some situations, a single bag could possibly be used which had the same width as the width of the hood. However, in most cases, as stated, a pair of the bags 114A and 114B would be utilized. Further, the bag or bags could be replaced by a molded plastic grass-catching container or containers, if desired.

Inasmuch as bags 114A and 114B are identical, only bag 114A will be described in detail. Bag 114A includes a cloth bag portion 116 having a forward wall 118, rear wall 120, and side walls 122 and 124. The lower end of the bag 116 is closed in conventional fashion. Bag frame 126 in the form of a formed rod is mounted in the upper end of the cloth bag portion 116 in conventional fashion and has a bag hanger 128 secured thereto, the upper forward end of which is adapted to be received by the opening 54 in cross-beam 44 to aid in supporting the bag 114A beneath the hood 74. The inner portion of bag frame 126 is supported upon the support 56 while the outer side of bag frame 126 is supported on the support 62.

Figure 8:
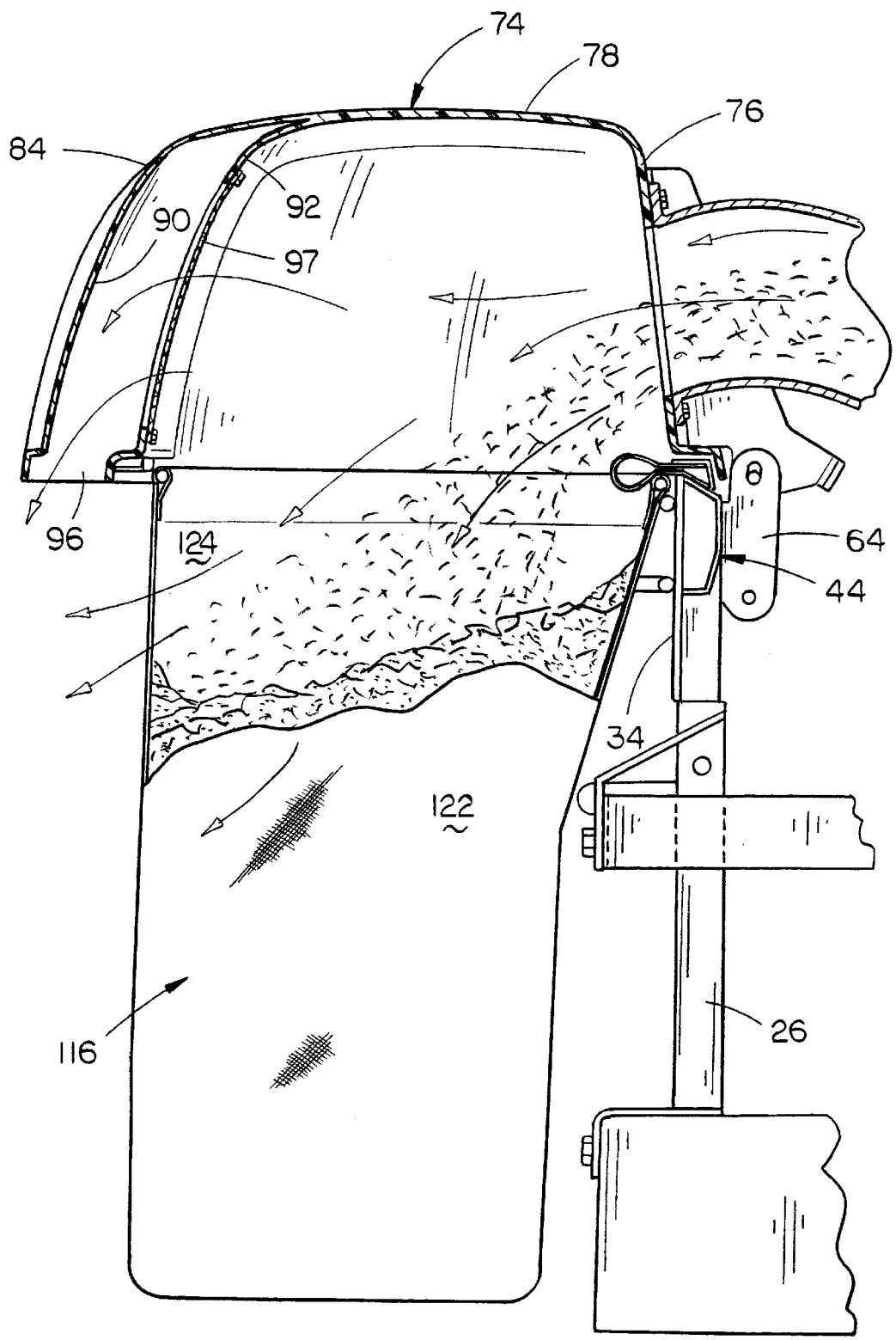
FIG. 8 is a partial sectional view illustrating the bagging assembly of this invention with the hood thereof in a closed position.

As previously stated, when the hood 74 is in its open condition for installing the empty bags within the assembly or removing full bags therefrom, the seal 98 prevents grass clippings and debris from falling forwardly through the space which would normally be present between the bag support and the lower forward end of the hood (FIG. 9). When the hood 74 is closed, as illustrated in FIG. 8, the seal 98 is positioned over the forward ends of the bag frames and seals the space between the upper ends of the bag and the lower end of the hood to prevent grass clippings, etc., from being blown forwardly from the interior of the hood. The engagement of the seal 98 with the forward ends of the bag frames of the bags 114A and 114B also aids in maintaining the bags 114A and 114B in position during the time the hood 74 is closed.

The grass collection bag 114A incorporates three walls (120, 122, 124) of a loose weave material that will allow air to pass easily through them, and a fourth wall (118) of a tight weave material that prevents air flow. The loose weave material is common in grass bags and allows the air from the deck discharge to escape sidewardly and rearwardly, thus increasing the density of the clippings in the bag. The tight weave panel 118 is designed to prevent air from the deck discharge from escaping towards the mower. The deck discharge air contains large quantities of dust and debris, which are detrimental to the longevity of the mower.

Thus can be seen that the invention accomplishes at least all of its stated objectives.

We claim:

1. In combination with a riding lawn mower, having rearward and forward ends, including a mower deck having a grass discharge conduit extending rearwardly and upwardly therefrom, comprising:

an elongated, horizontally disposed cross-beam secured to the rearward end of the mower having opposite ends, a rearward end, a forward end, an upper end, and a lower end;

a bag support positioned rearwardly of said cross-beam;

at least one bag positioned on said bag support having an open upper end which receives grass clippings therein;

a hood including an upstanding front wall, a top wall, opposite upstanding side walls, an upstanding rear wall, and an open bottom opening defined by the lower ends of said front wall, opposite side walls, and said rear wall;

said hood being operatively hingedly connected to said cross-beam to enable said hood to be hingedly moved between open and closed positions with respect to said bag positioned on said bag support;

and an elongated, generally rectangular flexible hinge seal having a lower end, an upper end, opposite ends, and opposite surfaces;

said lower end of said hinge seal being secured to said cross-beam;

said upper end of said hinge seal being secured to said front wall of said hood adjacent the lower end thereof.

2. The combination of claim 1 wherein said flexible seal extends substantially the entire length of said cross-beam.

3. The combination of claim 1 wherein said bag includes a support frame at its open upper end including a front frame portion, opposite side frame portions, and a rear frame portion and wherein said flexible hinge seal engages and overlies said front frame portion when said hood is in its said closed position.

4. The combination of claim 1 wherein first and second bags are positioned on said bag support and wherein each of said first and second bags includes a support frame at its open upper end including a front frame portion, first and second side frame portions, and a rear frame portion; and wherein said flexible hinge seal engages and overlies said front frame portions of said first and second bags when said hood is in its said closed position.

5. The combination of claim 3 wherein said flexible hinge seal is moved upwardly and forwardly out of engagement with said front frame portion as said hood is hingedly moved from its said closed position to its said open position to enable said bag to be removed from said bag support.

6. The combination of claim 4 wherein said flexible hinge seal is moved upwardly and forwardly out of engagement with said front frame portions of said first and second bags as said hood is hingedly moved from its said closed position to its said open position to enable said first and second bags to be removed from said bag support.

7. The combination of claim 6 wherein said bag support includes a centrally positioned support operatively secured to said cross-beam which extends horizontally rearwardly therefrom; a first side support operatively secured to said cross-beam which extends horizontally rearwardly therefrom at one end thereof; a second side support operatively secured to said cross-beam which extends horizontally rearwardly therefrom at the other end thereof; said front frame portions of said pair of bags being detachably secured to said cross-beam; said first side frame portion of said first bag being supported upon said first side support; said second side frame portion of said first bag being supported upon said centrally positioned support; said first side frame portion of said second bag being supported on said centrally positioned support; said second side frame portion of said second bag being supported upon said second side support.

8. The combination of claim 1 wherein said upper end of said hinge seal is positioned in a substantially horizontally disposed condition when said hood is in its said closed position.

9. The combination of claim 1 wherein said upper end of said cross-beam is inclined upwardly from the forward end thereof to the rearward end thereof.

10. The combination of claim 1 wherein the hinge connection between said hood and said cross-beam permits a predetermined amount of vertical movement therebetween.

11. The combination of claim 9 wherein the hinge connection between said hood and said cross-beam permits a predetermined amount of vertical movement therebetween.

12. The combination of claim 1 wherein said bag comprises a front panel, a rear panel and opposite side panels; said rear panel and said side panels being constructed of a material which permits the flow of air therethrough; said front panel being constructed of a material which prevents the flow of air therethrough.

13. The combination of claim 4 wherein each of said first and second bags comprises a front panel, a rear panel and opposite side panels; said rear panel and said side panels being constructed of a material which permits the flow of air therethrough; said front panel being constructed of a material which prevents the flow of air therethrough.

14. In combination with a riding lawn mower, having rearward and forward ends, including a mower deck having a grass discharge conduit extending rearwardly and upwardly therefrom, comprising:

a support assembly secured to the rearward end of the lawn mower for supporting at least one grass catcher, having an open upper end, thereon;

said support assembly including a support and a supporting framework for supporting said grass catcher;

a hood disposed above said grass catcher including an upstanding front wall, a top wall, opposite upstanding side walls, an upstanding rear wall, and an open bottom opening defined by the lower ends of said front wall, opposite side walls, and said rear wall;

said hood being operatively hingedly movable to enable said hood to be hingedly moved between open and closed positions;

and an elongated, generally rectangular flexible hinge seal having a lower end, an upper end, opposite ends, and opposite surfaces;

said lower end of said hinge seal being operatively secured to said support;

said upper end of said hinge seal being secured to said front wall of said hood adjacent the lower end thereof.

15. The combination of claim 14 wherein said support is elongated and is horizontally disposed and wherein said flexible seal extends substantially the entire length of said support.

16. The combination of claim 14 wherein said grass catcher upper end includes a front portion, opposite side portions, and a rear portion and wherein said flexible hinge seal engages and overlies said front portion when said hood is in its said closed position.

17. The combination of claim 14 wherein first and second grass catchers are supported on said support assembly and wherein the upper end of each of said first and second grass catchers includes a front portion, first and second side portions, and a rear portion; and wherein said flexible hinge seal engages and overlies said front portions of said first and second grass catchers when said hood is in its said closed position.

18. The combination of claim 16 wherein said flexible hinge seal is moved upwardly and forwardly out of engagement with said front frame as said hood is hingedly moved from its said closed position to its said open position to enable said grass catcher to be removed from said support assembly.

19. The combination of claim 17 wherein said flexible hinge seal is moved upwardly and forwardly out of engagement with said front portions of said upper ends of said first and second grass catchers as said hood is hingedly moved from its said closed position to its said open position to enable said first and second grass catchers to be removed from said support assembly.

20. The combination of claim 14 wherein said upper end of said hinge seal is positioned in a substantially horizontally disposed condition when said hood is in its said closed position.

21. The combination of claim 14 wherein the hinge connection between said hood and said support permits a predetermined amount of vertical movement therebetween.

22. The combination of claim 14 wherein said grass catcher comprises at least one flexible bag; said bag comprising a front panel, a rear panel and opposite side panels; said rear panel and said side panels being constructed of a material which permits the flow of air therethrough; said front panel being constructed of a material which prevents the flow of air therethrough.

23. The combination of claim 14 wherein said grass catcher upper end includes a front frame, opposite side frames, and a rear frame and wherein said flexible hinge seal engages and overlies said front frame when said hood is in its said closed position.

24. The combination of claim 14 wherein said grass catcher includes a front panel, a rear panel and opposite side panels; said rear panel and said side panels being constructed to permit the flow of air therethrough, said front panel being constructed to prevent the flow of air therethrough.

\* \* \* \* \*